(12) United States Patent
Lewis et al.

(10) Patent No.: US 7,982,765 B2
(45) Date of Patent: *Jul. 19, 2011

(54) APPARATUS, SYSTEM, AND METHOD FOR CAPTURING AN IMAGE WITH A SCANNED BEAM OF LIGHT

(75) Inventors: John R. Lewis, Bellevue, WA (US); Clarence T. Tegreene, Bellevue, WA (US)

(73) Assignee: Microvision, Inc., Redmond, WA (US)

( * ) Notice: Subject to any disclaimer, the term of this patent is extended or adjusted under 35 U.S.C. 154(b) by 1163 days.

This patent is subject to a terminal disclaimer.

(21) Appl. No.: 11/717,406

(22) Filed: Mar. 12, 2007

(65) Prior Publication Data

US 2007/0165016 A1 Jul. 19, 2007

(51) Int. Cl.
*H04N 5/253* (2006.01)
*H04N 7/18* (2006.01)
*G02B 27/14* (2006.01)

(52) U.S. Cl. ............ 348/98; 348/94; 359/629; 359/630; 359/631; 359/632; 359/633

(58) Field of Classification Search ............ 348/98, 348/209.99, 210.99, 326, 327
See application file for complete search history.

(56) References Cited

U.S. PATENT DOCUMENTS

| | | |
|---|---|---|
| 3,867,633 A | 2/1975 | Patrick et al. |
| 4,324,452 A | 4/1982 | Noguchi et al. |
| 4,349,815 A | 9/1982 | Spooner |
| 4,598,585 A | 7/1986 | Boxenhorn |
| 4,699,006 A | 10/1987 | Boxenhorn |
| 5,200,827 A | 4/1993 | Hanson et al. |
| 5,245,463 A | 9/1993 | Goto et al. |
| 5,355,181 A | 10/1994 | Ashizaki et al. |
| 5,467,104 A | 11/1995 | Furness, III et al. |
| 5,539,422 A | 7/1996 | Heacock et al. |
| 5,546,492 A | 8/1996 | Ansley et al. |
| 5,557,444 A | 9/1996 | Melville et al. |
| 5,570,222 A | 10/1996 | Chovan |
| 5,596,339 A | 1/1997 | Furness, III et al. |
| 5,648,618 A | 7/1997 | Neukermans et al. |
| 5,659,327 A | 8/1997 | Furness, III et al. |
| 5,691,834 A | 11/1997 | Plesko |
| 5,694,237 A | 12/1997 | Melville |
| 5,701,132 A | 12/1997 | Kollin et al. |

(Continued)

*Primary Examiner* — Lin Ye
*Assistant Examiner* — John H Morehead, III
(74) *Attorney, Agent, or Firm* — Kevin D. Wills

(57) ABSTRACT

According to an embodiment, an image capture apparatus comprises a light emitter, a beam scanner aligned to receive emitted light and operable to scan the light in a two-dimensional pattern, imaging optics aligned to receive the scanned two-dimensional pattern and image the pattern onto an object, and to collect light scattered from the object, a detector to receive scattered light from the imaging optics, an electronic controller c operable to receive an electrical signal from the detector corresponding to the received scattered light, and an actuator operable to modify the relative alignment between the beam scanner and the imaging optics to change an imaged location on the object. According to an embodiment, a method for capturing an image comprises scanning a beam of light through imaging optics onto a location on a surface, detecting light scattered by the surface, and steering the beam scanner relative to the imaging optics to change the trajectory of the scanned pattern. According to an embodiment, a system for scanning a field of view comprises a light source, an optical fiber, a MEMs scanner aligned to receive the light from the optical fiber and operable to scan the light through a partially-reflective imaging optic in a pattern, and a photodetector aligned to receive light scattered from the field of view.

15 Claims, 12 Drawing Sheets

U.S. PATENT DOCUMENTS

| | | |
|---|---|---|
| 5,726,671 A | 3/1998 | Ansley et al. |
| 5,742,419 A | 4/1998 | Dickensheets et al. |
| 5,751,465 A * | 5/1998 | Melville et al. ............ 359/213.1 |
| 6,008,781 A * | 12/1999 | Furness et al. .................... 345/8 |
| 6,084,716 A | 7/2000 | Sanada et al. |
| 6,198,564 B1 | 3/2001 | Knight |
| 6,285,505 B1 | 9/2001 | Melville et al. |
| 6,538,625 B2 * | 3/2003 | Tidwell et al. .................... 345/8 |
| 6,734,835 B2 * | 5/2004 | Tidwell et al. .................... 345/8 |
| 7,190,329 B2 * | 3/2007 | Lewis et al. ....................... 345/7 |
| 7,230,583 B2 * | 6/2007 | Tidwell et al. .................... 345/8 |
| 2004/0196213 A1 * | 10/2004 | Tidwell et al. .................... 345/8 |

* cited by examiner

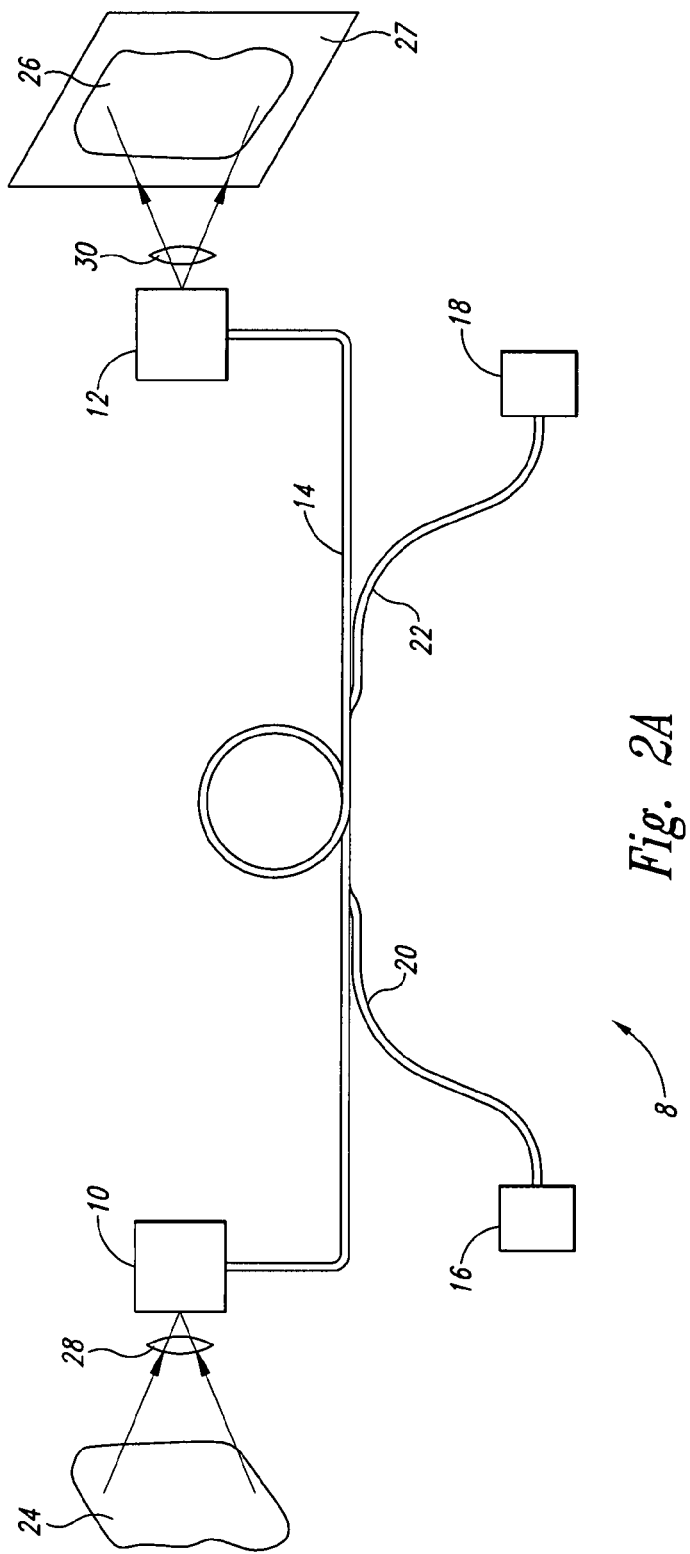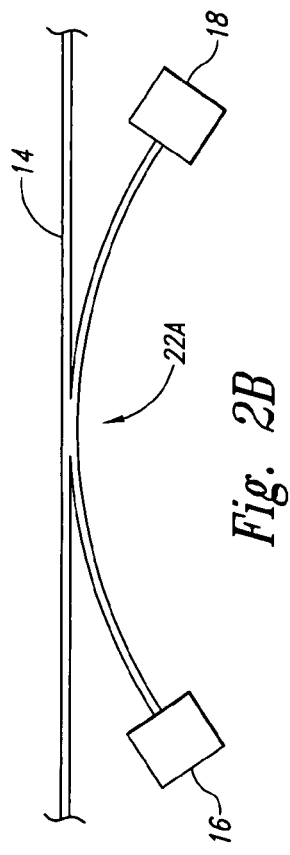
Fig. 2A
Fig. 2B

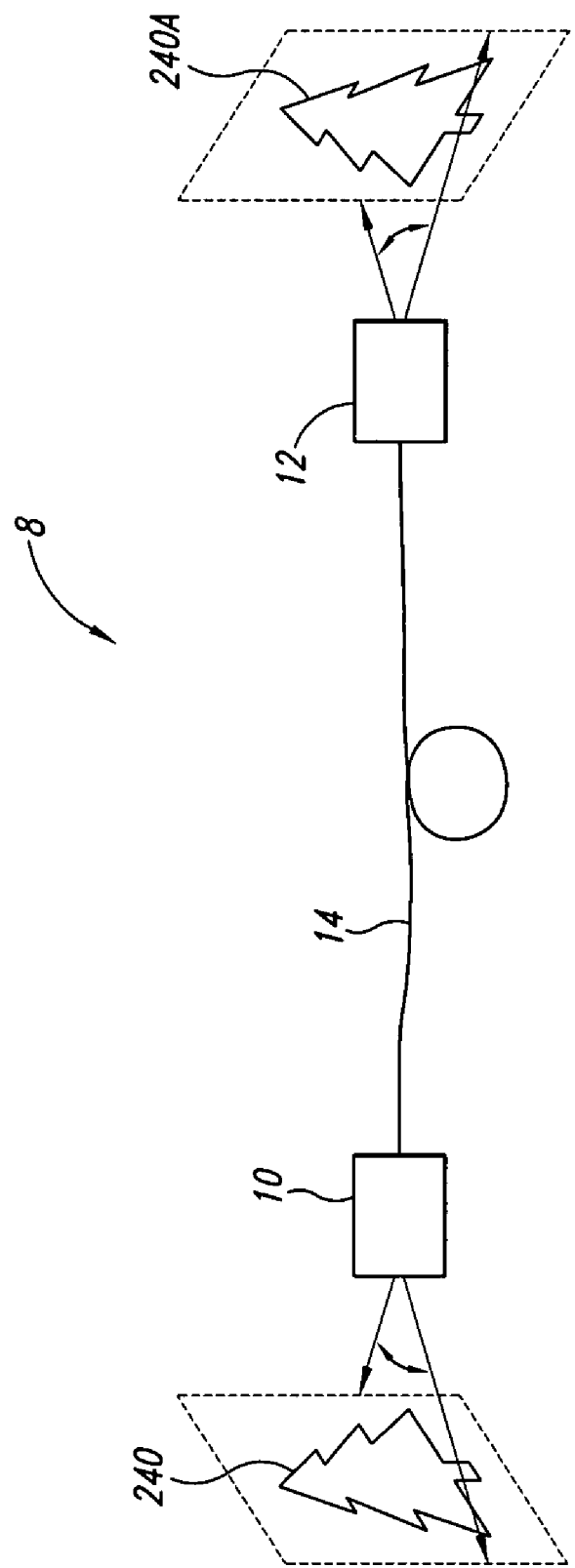

APPARATUS, SYSTEM, AND METHOD FOR CAPTURING AN IMAGE WITH A SCANNED BEAM OF LIGHT

CROSS-REFERENCE TO RELATED APPLICATIONS

The present application claims priority benefit under 37 CFR §1.20 from U.S. patent application Ser. No. 10/601,921, copending at the time of the time of this application and filed Jun. 20, 2003 now U.S. Pat. No. 7,190,329; which depends from U.S. patent application Ser. No. 09/129,739, now U.S. Pat. No. 6,583,772, filed Aug. 5, 1998.

TECHNICAL FIELD

The present invention relates to optical imaging systems and, more particularly, to systems employing scanning inputs or outputs.

BACKGROUND OF THE INVENTION

A variety of techniques are available for providing visual displays of graphical or video images to a user. For example, cathode ray tube displays ("CRTs"), such as televisions and computer monitors, are very common. Such devices suffer from several limitations. Conventional CRTs are typically bulky and consume substantial amounts of power, making them undesirable for portable or head-mounted applications.

Flat panel displays, such as liquid crystal displays, plasma displays, and field emission displays, may be less bulky and consume less power. However, typical flat panel displays utilize screens that are several inches across. Such screens have limited use in head mounted applications or in applications where the display is intended to occupy only a small portion of a user's field of view.

More recently, very small displays have been developed for partial or augmented view applications and for various head-mounted applications. In augmented view applications, a portion of the display is positioned in the user's field of view and presents an image that occupies a small region 42 of the user's field of view 44, as shown in FIG. 1. The user can thus see both a displayed image 46 and background information 48.

One application of such small displays in found in dual-ended systems, i.e., systems in which images are acquired at one end and transmitted to a second end for output. For example, remote viewing systems typically utilize small detectors or cameras (such as CCD arrays) at a first end that convert images to electrical signals. Then, the electrical signals are either (a) transmitted along conductors; or (b) converted to optical data and transmitted along optical fibers to the second end. At the second end, the electrical signals or optical data are converted back to optical images by electronic or optoelectronic circuitry and a miniature display. Within the display, some form of the electronic or optoelectonic circuitry converts the electrical or optical signal to an electrical driving signal that is applied to the miniature display. The display then converts the signal to the viewable image.

Such approaches usually have several drawbacks. For example, conversion between electrical signals and optical signals typically induces image distortion and noise. Also, in typical systems, the image is reconstructed by combining light from red, green, and blue light sources (e.g., phosphors or laser diodes). Such systems can induce some form of color distortion. Moreover, electrical circuitry can be sensitive to temperature or other environmental variations and to electromagnetic fields. In many applications, temperature controllers and electrical shielding can protect the electrical circuitry. However, such controllers and shielding can impose significant weight and size limitations. In head-mounted applications, this additional weight can place stress on the wearer's neck and may also increase the difficulty of packaging.

SUMMARY OF THE INVENTION

In an optical imaging apparatus, light from an optical image is scanned by a first scanner at one location and transmitted by an optical transmission fiber to a second location without converting the optical information to electrical signals. In one embodiment, a second scanner receives light from the fiber and reconstructs the optical image by scanning substantially synchronously with the first scanner.

In one embodiment, a first light emitter is coupled to the transmission fiber through a fiber coupler. The first light emitter provides illuminating light to the transmission fiber and the transmission fiber transmits the illuminating light to the input scene. The first scanner scans the illuminating light over the input scene. The input scene reflects a portion of the scanned illuminating light and back to the input scanner which then couples the reflected light into the transmission fiber for transmission to the second scanner.

In one embodiment, the first emitter is a full spectrum illuminator, such as a mercury vapor lamp, white light laser or short arc lamp. If the full spectrum illuminator does not provide adequate luminance, the emitter can be formed from one or more monochrome sources, such as laser diodes.

In one embodiment, both of the scanners act as transceivers. The first scanner thus scans images from the first scene and the transmission fiber transmits the light from the first scanner to the second scanner. The second scanner recreates the first scene from the scanned light. At the same time, the second scanner scans images from a second scene and the transmission fiber transmits the light from the second scanner to the first scanner. The first scanner recreates the second scene from the scanned light. To improve imaging, one or more of the scanners includes confocal optics that couple light to and from the respective scene. For viewing, one embodiment includes a beam splitter and imaging optics that display the image on a screen.

In another embodiment, one of the scanners couples light directly to the retina of a viewer. One embodiment of the retinal scanner includes a beam combiner that receives light from the fiber and light from a background. The combined light from the combiner is received through the user's pupil and strikes the retina. The light from the fiber forms a "virtual" image and the light from the background forms a "real" image. The user perceives an image that is a combination of the virtual image and the real image.

In one embodiment, the retinal scanner includes an eye tracking mechanism that monitors the position of the wearer's eye and adjusts the position of the scanned beam of light so that the wearer continues to see the virtual image as the wearer moves the eye to view the real image.

In another embodiment according to the invention, a separate fiber carries the illuminating light. To improve coupling of reflected light into the transmission fiber, the separate fiber and the transmission fiber are bonded together with their far or intermediate fields overlapped. Each of the transmission fiber and the separate fiber are formed as D-shaped fibers so that the cores of the fibers can be positioned substantially closely.

In one embodiment, the transmission fiber may include components that allow active or passive modification of the transmitted light. For example, in some applications it may be desirable to incorporate in-line fiber amplifiers to amplify the light being transmitted. In other amplifications, active switching can allow the transmitted light to be selectively directed along one or more alternative paths. In still other applications, the visible light may be directly down converted to typical communication system wavelengths for long distance transmissions and then up converted to visible wavelengths after transmission. Such wavelength shifting approaches may be adapted to wavelength division multiplex light from a plurality of input scanners along a common optical path.

BRIEF DESCRIPTION OF THE FIGURES

FIG. 2A shows a linked scanner system according to one embodiment of the invention including pair of scanners linked by a transmission fiber where a pair of light emitters are coupled to the transmission fiber to provide light for illumination.

FIG. 2B shows an alternative approach to coupling light using a single fiber coupler.

FIG. 16 is a diagrammatic representation of a dual-ended fiber imager showing effective magnification.

DETAILED DESCRIPTION OF THE INVENTION

Figure 1:
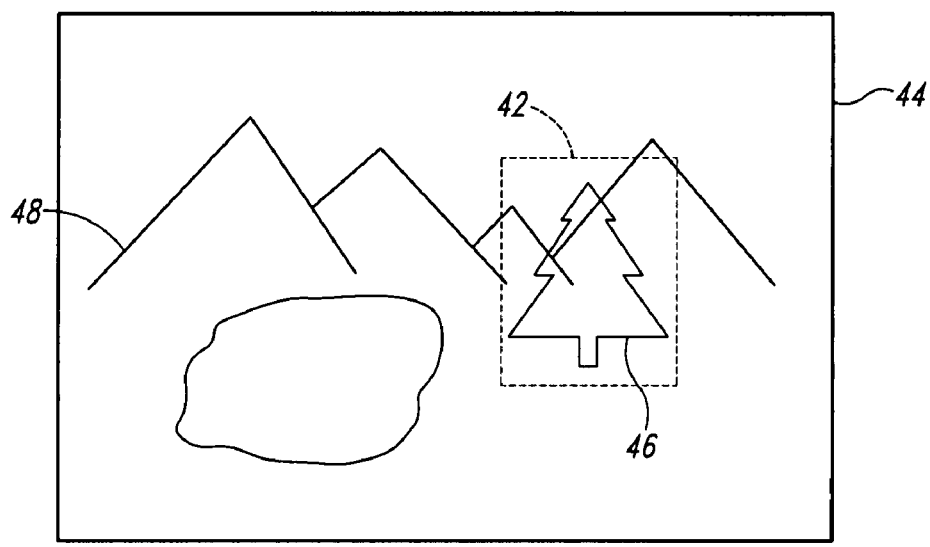
FIG. 1 is a diagrammatic representation of a combined image perceived by a user resulting from the combination of light from an image source and light from a background.

As shown in FIG. 2A, a dual-ended optical imager 8 is formed from a pair of scanners 10, 12 linked by a transmission fiber 14, where each of the scanners 10, 12 acts as an optical transceiver. The structure and operation of the scanners 10, 12 are described in greater detail herein with respect to FIGS. 5 and 6. Also, an example of a fiber-coupled scanning display is found in U.S. Pat. No. 5,596,339 of Furness et. al., entitled VIRTUAL RETINAL DISPLAY WITH FIBER OPTIC POINT SOURCE which is incorporated herein by reference. As will also be explained below, the scanners 10, 12 are synchronized so that they scan in substantially the same pattern at substantially the same rate.

A pair of light emitters 16, 18 are coupled to the transmission fiber 14 by respective fiber couplers 20, 22 to provide input light for illumination. As shown in FIG. 2B, a single fiber coupler 22A can couple light form both of the light emitters 16, 18 in the transmission fiber. Returning to FIG. 2A, the light emitters 16, 18 are preferably full spectrum light sources, although monochrome sources may be desirable for some applications. Where full spectrum light is desired, the light emitters 16, 18 may be small mercury vapor lamps, white light lasers or short arc lamps. For monochrome applications, laser diodes or other light emitting diodes may be used. In some color applications, each of the light emitters may include a plurality of light sources. For example, each of the light emitters 16, 18 may include red, green and blue lasers. Alternatively, the light emitters may use non-visible illuminating light in some applications. For example, in scanning ophthalmascope applications ultraviolet or infrared light may be useful for detection of certain types of body tissue. In such applications, a wavelength converting viewer, such as an infrared viewer, may be added the output scanner.

As described in the following discussion and as indicated by the arrows in FIG. 2A, the left scanner 10 is operating as the input scanner and the right scanner 12 is operating as the output scanner. However, in many applications, each of the scanners 10, 12 may act as both an input scanner and an output scanner to achieve bi-directional communication. Communication in a single direction will be described first.

To image a scene 24, the right emitter 18 emits light that is coupled to the transmission fiber 14 through the fiber coupler 22. The transmission fiber 14 transmits the light to the input scanner 10 where the light is scanned onto the scene 24 in a two dimensional pattern, such as a raster pattern, to illuminate the scene 24. At each position of the input scanner 10, a portion of the illuminating light is reflected back to the input scanner 10 by the scene 24. Because light travels to and from the scene 24 very quickly, the position of the input scanner 10 does not change significantly before the reflected light reaches the input scanner 10. Therefore, the input scanner 10 couples the reflected light back into the transmission fiber 14, which then transmits the reflected light to the output scanner 12.

The output scanner 12 scans the light from the transmission fiber 14 in the same pattern and at the same frequency as the input scanner 10 to reconstruct the scene 24 as a virtual scene 26. Where the input scanner 10 is sufficiently distant from the output scanner 12, propagation delay through the transmission fiber may affect the displayed images. In such applications, it may be desirable to adjust the timing of the output scanner 12 to compensate for the delay. As shown in FIG. 2A, light output from the scanner 12 strikes a viewing screen 27, thereby producing an image for viewing by the user. One skilled in the art will recognize that the output scanner 12 may be incorporated into a retinal scanning display in some applications, such as where the imager 8 is operated as a unidirectional imager.

To improve coupling of the illuminating and reflected light into the scanners 10, 12, the scanners 10, 12 include confocal optics similar to those of a confocal microscope. Although the confocal optics 28, 30 are represented as simple lenses, one skilled in the art will recognize that a variety of confocal optics 28, 30 may be used. Also, though the confocal optics 28, 30 are shown as separate from the scanners 10, 12 the optics 28, 30 are typically integrated into the scanners 10, 12, as will be described below with reference to FIG. 5.

Figure 3:
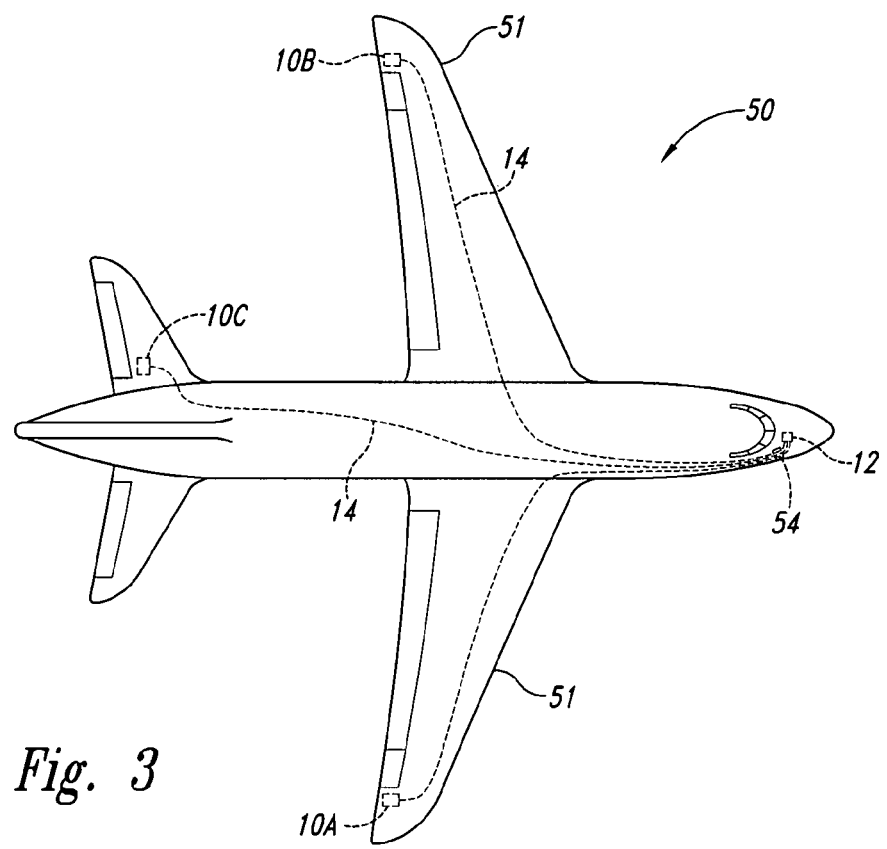
FIG. 3 shows one application of a linked scanner system including three input scanners located at respective locations on an aircraft.

One application of the imager 8 is shown in FIG. 3, where an aircraft 50 includes three scanners 10A-C that are located along each wing 51 and at the rear of the aircraft 50. In these locations, the input scanners 10A-C can image the wings and flaps to show icing, vibration, deformation, or flap position. The transmission fibers 14 for each of the scanners 10A-C extend from the scanners 10A-C to the cockpit, where they are coupled to a single output scanner 12 through an optical switch 54. The switch may be one of many known optical switches, such as an in-line fiber optic switch. By controlling the switch 54, a pilot can selectively view images from the input scanners 10A-C.

Figure 4:
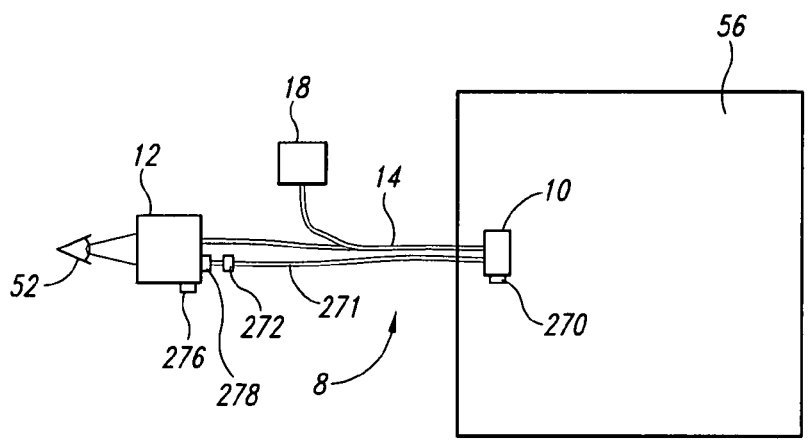
FIG. 4 shows another application of a linked scanner system including an input scanner located in a separated environment for remote viewing of the environment.

As shown in FIG. 4, the imager 8 may also be used to remotely view a hazardous or otherwise inaccessible environment 56, such as a toxic gas or high-temperature environment or an internal cavity of a human body. In this embodiment, the input scanner 10 is inserted into the environment 56 and oriented to view an appropriate portion of the environment 56. A single emitter 18 is coupled to the input scanner 10 by the transmission fiber 14 to provide light that illuminates the environment 56. Light reflected from the environment 56 is received by the input scanner 10 and coupled back into the transmission fiber 14. The transmission fiber 14 transmits the received light to the output scanner 12 for viewing by a viewer's eye 52. Because the light is not converted to an electrical signal and re-converted to an optical signal, the viewer perceives light originating from the environment 56 without conversion artifacts.

Figure 5:
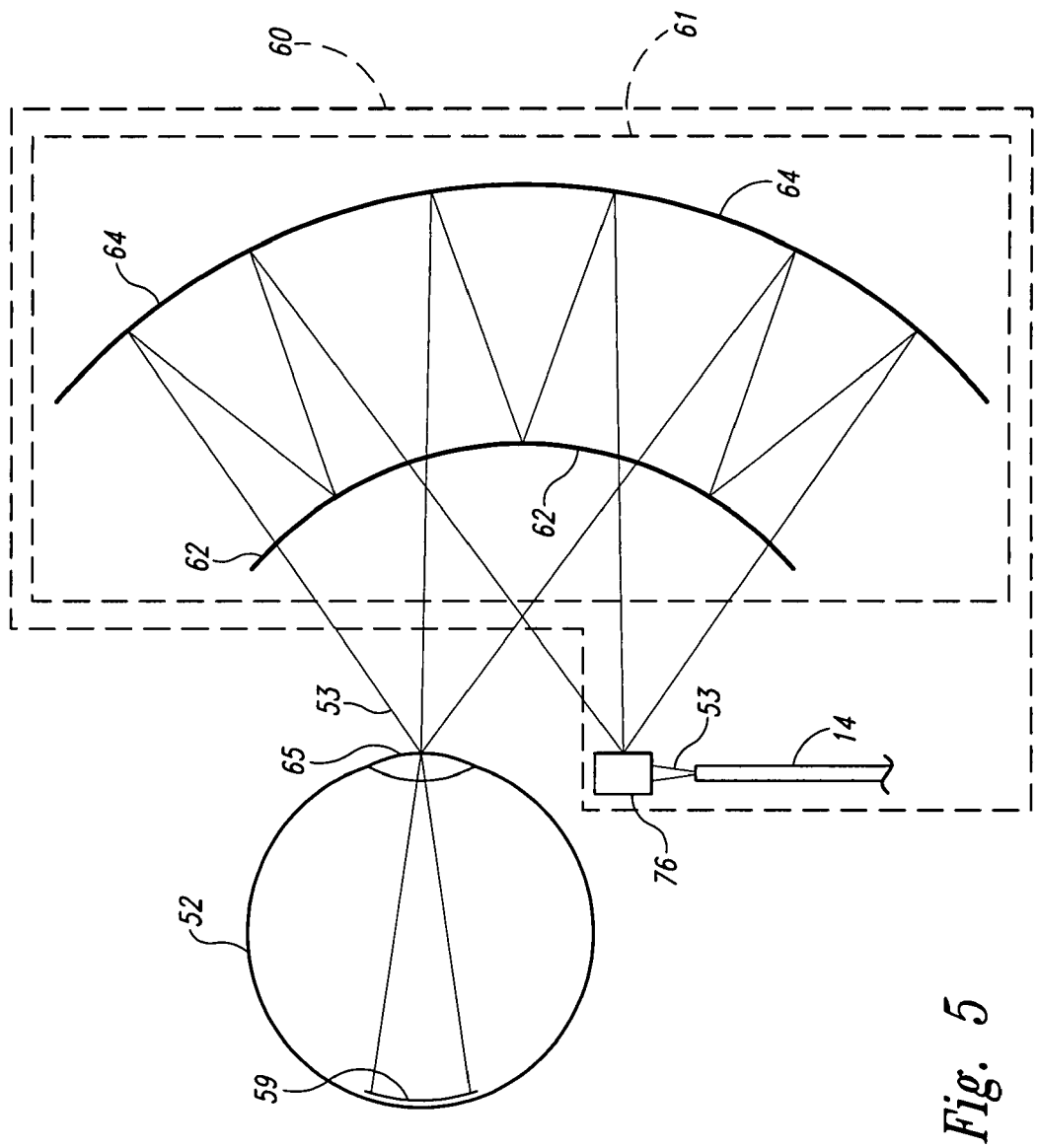
FIG. 5 is a diagrammatic representation of a scanning display suitable for use as one of the scanners of FIG. 2A.

A scanning device 60 suitable for use as one of the scanners 10, 12, shown in FIG. 5, is positioned for viewing by a viewer's eye 52 or for viewing features of the eye 52. One skilled in the art will recognize that, the embodiment of the device 60 is described herein for viewing the eye 52 for convenience of presentation, the device 60 may also be used to view many other objects. For example, the device 60 may be used to view an inaccessible or hazardous environment, as described above with reference to FIGS. 3 and 4.

The device 60 includes two principal portions, each of which will be described in greater detail below. The first portion of the device 60 is a scanning assembly 76 that scans an input beam 53 through a two-dimensional scanning pattern, such as a raster pattern. One example of such a scanning assembly is a mechanically resonant scanner, such as that described U.S. Pat. No. 5,557,444 to Melville, et. al. entitled MINIATURE OPTICAL SCANNER FOR A TWO-AXIS SCANNING SYSTEM, which is incorporated herein by reference. However, other scanning assemblies, such as acousto-optic scanners may be used in such displays.

Imaging optics 61 form the second portion of the device 60. The imaging optics 61 in the embodiment of FIG. 5 include a pair of mirrors 62 and 64 that shape and focus the beam 53 appropriately for imaging or for viewing by a viewer's eye 52. One skilled in the art will recognize that the mirror 62 may be partially transmissive so that a portion of the light will be reflected and a portion of the light will be transmitted.

To image the eye 52, the fiber 14 provides illuminating light that exits the fiber 14 and enters a scanning assembly 76. The scanning assembly 76 scans the illuminating light through a substantially raster pattern onto the imaging optics 61 so that the mirrors 62, 64 direct light toward the eye 52. The scanned light strikes the eye 52 (in this case the retina 59) and a portion of the light is reflected back to the mirrors 62, 64. The mirrors 62, 64 direct the reflected light to the scanning assembly 76. Because the time for light to travel from the scanning assembly 76, to the mirrors 62, 64 and retina 59 is very small, the scanning assembly 76 is in substantially the same condition as when the light first arrived from the fiber 14. Accordingly, the scanning assembly 76 couples the light from the mirrors 62, 64 back into the fiber 14. While the preferred embodiment described herein uses light reflected from the retina 59, other embodiments may se different optical structures or position the components differently to image other portions of the eye 52, such as the iris.

Viewing will now be described with reference to the same figure (FIG. 5), because the device 60 can operate bi-directionally. During viewing, the fiber 14 outputs the transmitted scanned light to the scanning assembly 76. The scanning assembly 76 scans the light both horizontally and vertically in a repetitive pattern, such as a raster pattern. The imaging optics 61 redirects and magnifies scanned light from the scanning assembly 76 toward the user's eye 52, where the light passes through the pupil 65 and strikes the retina 59 to produce a perceived virtual image. To ease the user's acquisition of light from mirrors 62, 64, the imaging optics 78 may also include an exit pupil expander that increases the effective numerical aperture of the beam of scanned light. The exit pupil expander is omitted from FIG. 5 for clarity of presentation of the beam 53.

As can be seen from FIG. 5, the user's eye 52 is typically in a substantially fixed location relative to the imaging optics 61 because the viewer's head is typically in a fixed location relative to the scanning assembly 76. For example, the scanner 10 may be rigidly mounted and include an eyecup against which the user's eye socket is pressed. For clarity, this description therefore does not discuss head movement in describing operation of the device 60. One skilled in the art will recognize that the user's head may be free for relative movement in some applications. In such applications, a known head tracking system may track the user's head position for coarse positioning.

Figure 6:
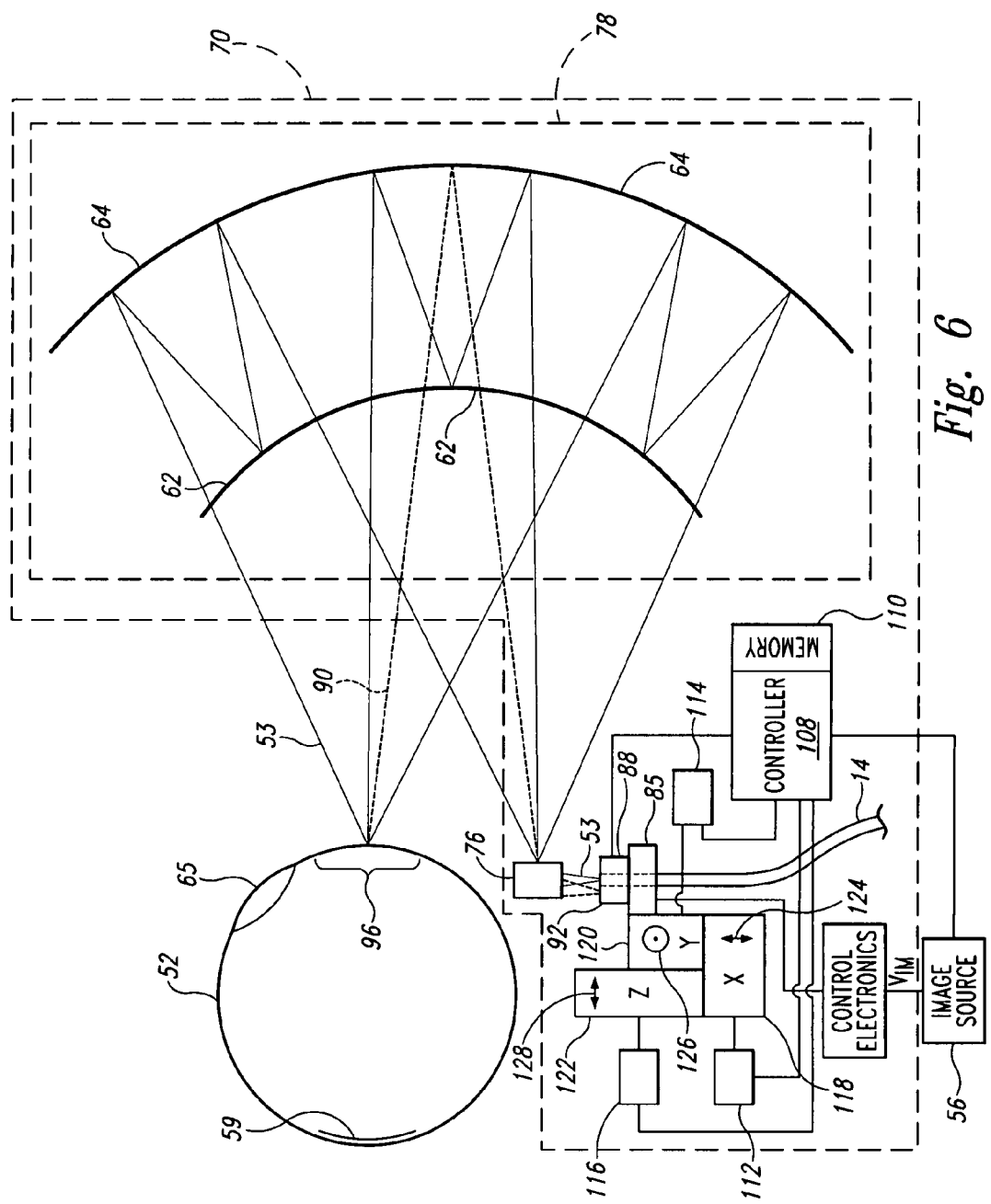
FIG. 6 is a diagrammatic representation of the display of FIG. 4 showing displacement of the eye relative to the beam position and corresponding reflection of the positioning beam.

When the user's eye 52 moves, the pupil 65 may move out of alignment with light from the fiber 14. In the embodiment of FIG. 6, eye tracking reduces such misalignment by monitoring the position of the user's eye 52 and adjusting the beam alignment, as will now be described with reference to FIGS. 6-9.

In addition to light from the fiber 14, the imaging optics 78 also receive a locator beam 90 from an infrared light source 92 carried in a common housing with the output scanner 12 (FIG. 2A). The output scanner 12 also includes combining optics that combine the infrared light with the scanned light so that the infrared and visible light are substantially collinear. Thus, the output of the imaging optics 78 includes light from the infrared light source 92. One skilled in the art will recognize that, although the infrared light source 92 is shown as being positioned orthogonally relative to the fiber 14, other implementations are easily realizable When the user's eye 52 moves, all or a portion of the light from the light source 74 and infrared source 92 may no longer enter the pupil 65 or may enter the pupil 65 at an orientation where the pupil 65 does not direct the light to the center of the retina 59. Instead, some of the light from the fiber 14 and source 92 strikes a non-pupil portion 96 of the eye. As is known, the non-pupil portion 96 of the eye has a reflectance different and typically higher than that of the pupil 65. Consequently, the non-pupil portion 96 reflects light from the sources 74, 92 back toward the imaging optics 78. The imaging optics 78 redirect the reflected light toward an optical detector 88 positioned on the substrate 85 adjacent to the source 92. In this embodiment, the detector 88 is a commercially available CCD array that is sensitive to infrared light. As will be described below, in some applications, other types of detectors may be desirable.

Figure 7A:
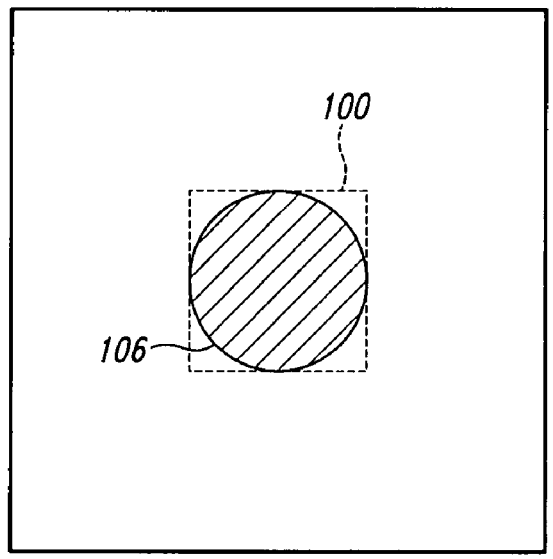
FIG. 7A is a diagrammatic representation of reflected light striking the detector in the position of FIG. 6.
Figure 7B:
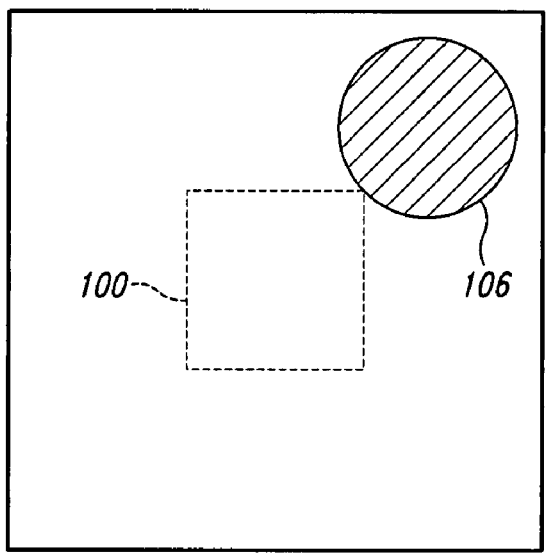
FIG. 7B is a diagrammatic representation of reflected light striking the detector in the position of FIG. 6.

As shown in FIG. 7A, when the user's eye is positioned so that light from the fiber 14 and source 92 enters the pupil (i.e., when the eye is positioned as shown in FIG. 4), a central region 100 of the detector 88 receives a low level of light from the imaging optics 78. The area of low light resulting from the user's pupil will be referred to herein as the pupil shadow 106. When the eye 52 shifts to the position shown in FIG. 6, the pupil shadow 106 shifts relative to the detector 88 as shown in FIG. 7B. In response the detector 88 outputs data, which are indicative of the position of the pupil shadow 106. The data are input to control electronics 108, such as a microprocessor or application specific integrated circuit (ASIC). Responsive to the data, the control electronics 108 accesses a look up table in the memory device 110 to retrieve positioning data indicating an appropriate positioning correction for the light source 74. The positioning data may be determined empirically or may be calculated based upon known geometry of the eye 52 and the scanner 12.

In response to the retrieved positioning data, the control electronics 108 activates X, Y and Z drivers 112, 114, 116 to provide voltages to respective piezoelectric positioners 118, 120, 122 coupled to the substrate 85. As is known, piezoelectric materials deform in the presence of electrical fields, thereby converting voltages to physical movement. Therefore, the applied voltages from the respective drivers 112, 114, 116 cause the piezoelectric positioners 118, 120, 122 to move the fiber 14 and source 92, as indicated by the arrows 124, 126, 128 in FIG. 8.

Figure 8:
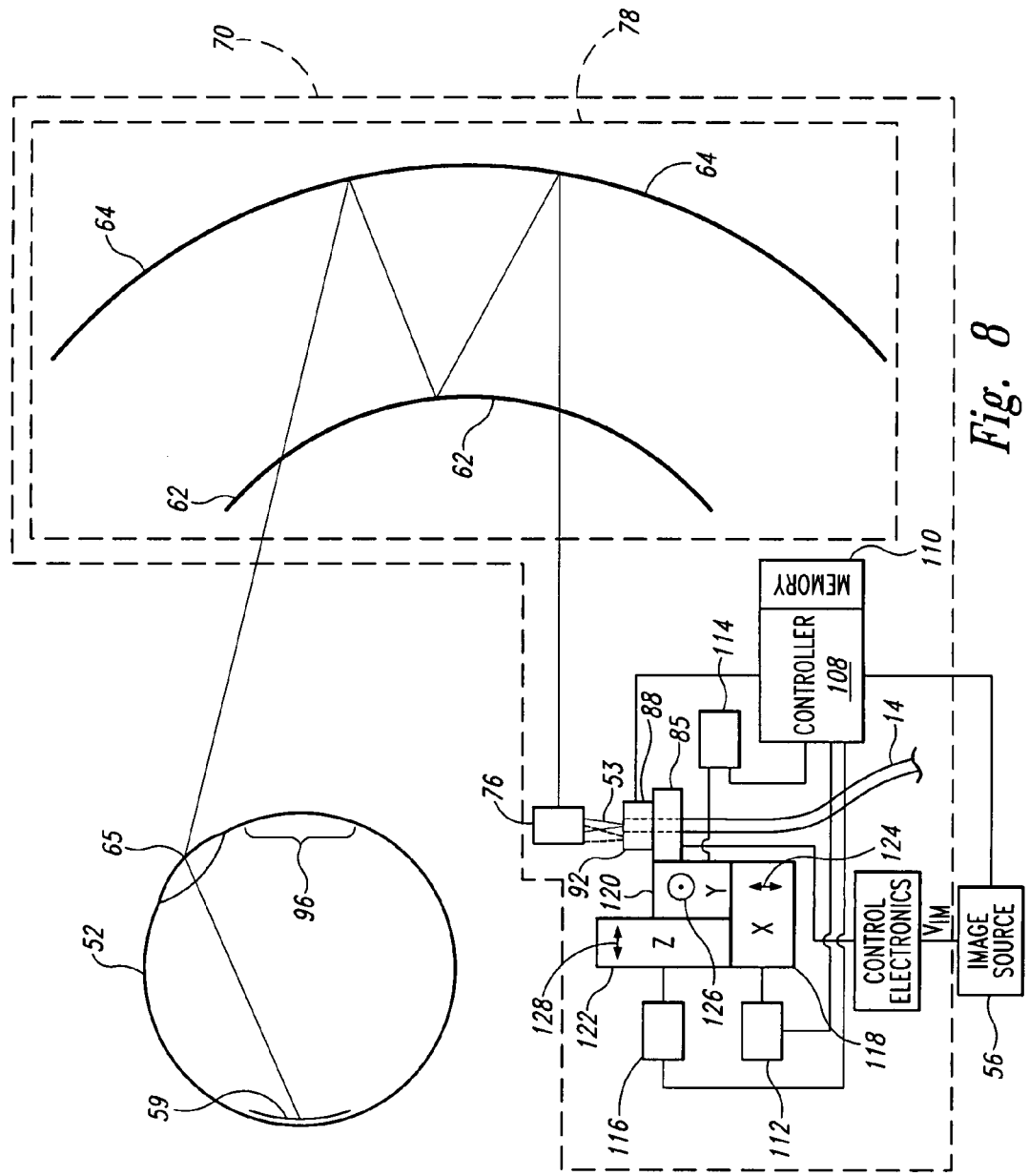
FIG. 8 is a diagrammatic representation of the display of FIG. 2A showing repositioning of the image source and positioning beam source responsive to detection of the displacement of FIG. 6.

As shown in FIG. 8, shifting the positions of the fiber 14 and source 92 shifts the locations at which light from the fiber 14 and source 92 strikes the user's eye, so that the light once again enters the pupil 65. The pupil shadow 106 once again returns to the position shown in FIG. 7A. One skilled in the art will recognize that the deformation of the piezoelectric positioner 116 is exaggerated in FIG. 8 for demonstrative purposes. However, because the mirrors 62, 64 may have a magnification greater than one, small shifts in the position of the substrate 85 can produce larger shifts in the location at which the light from the light source 74 arrives at the eye. Thus, the piezoelectric positioners 118, 120, 122 can produce sufficient beam translation for many positions of the eye. Where even larger beam translations are desirable, a variety of other types of positioners, such as electronic servomechanisms may be used in place of the piezoelectric positioners 118, 120, 122.

Figure 9:
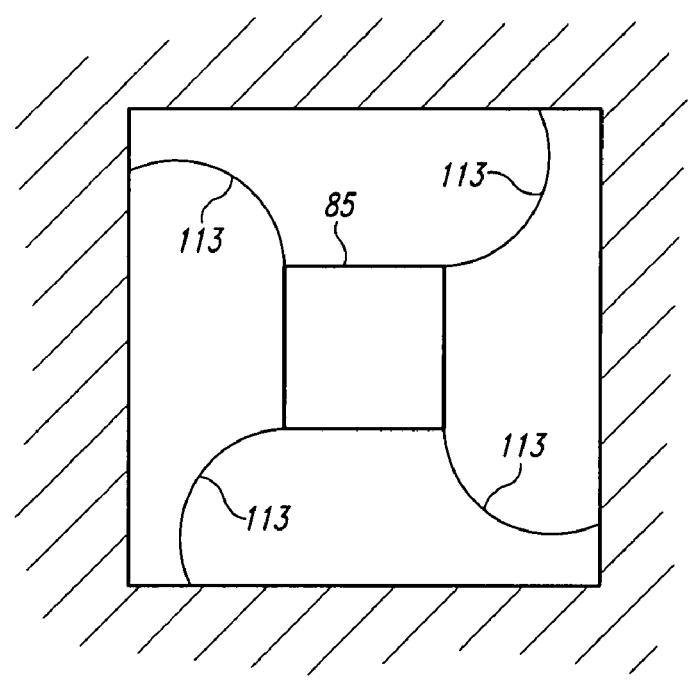
FIG. 9 is a detail view of a portion of a display showing shape memory alloy-based positioners coupled to the substrate.

Alternatively, shape memory alloy-based positioners 113 can be used to reposition the substrate as shown in FIG. 9. Shape memory alloys are known materials, such as equiatomic nickel-titanium alloys, that change shape in response to energy inputs, such as heat induced by electrical currents. The positioners 113 may be spirally located, as shown in FIG. 9 or may be in any other appropriate configuration. One skilled in the art will also recognize that the imaging optics 78 does not always require magnification, particularly where the positioners 118, 120, 122 are formed from a mechanism that provides relatively large translation of the scanner 70.

Figure 10:
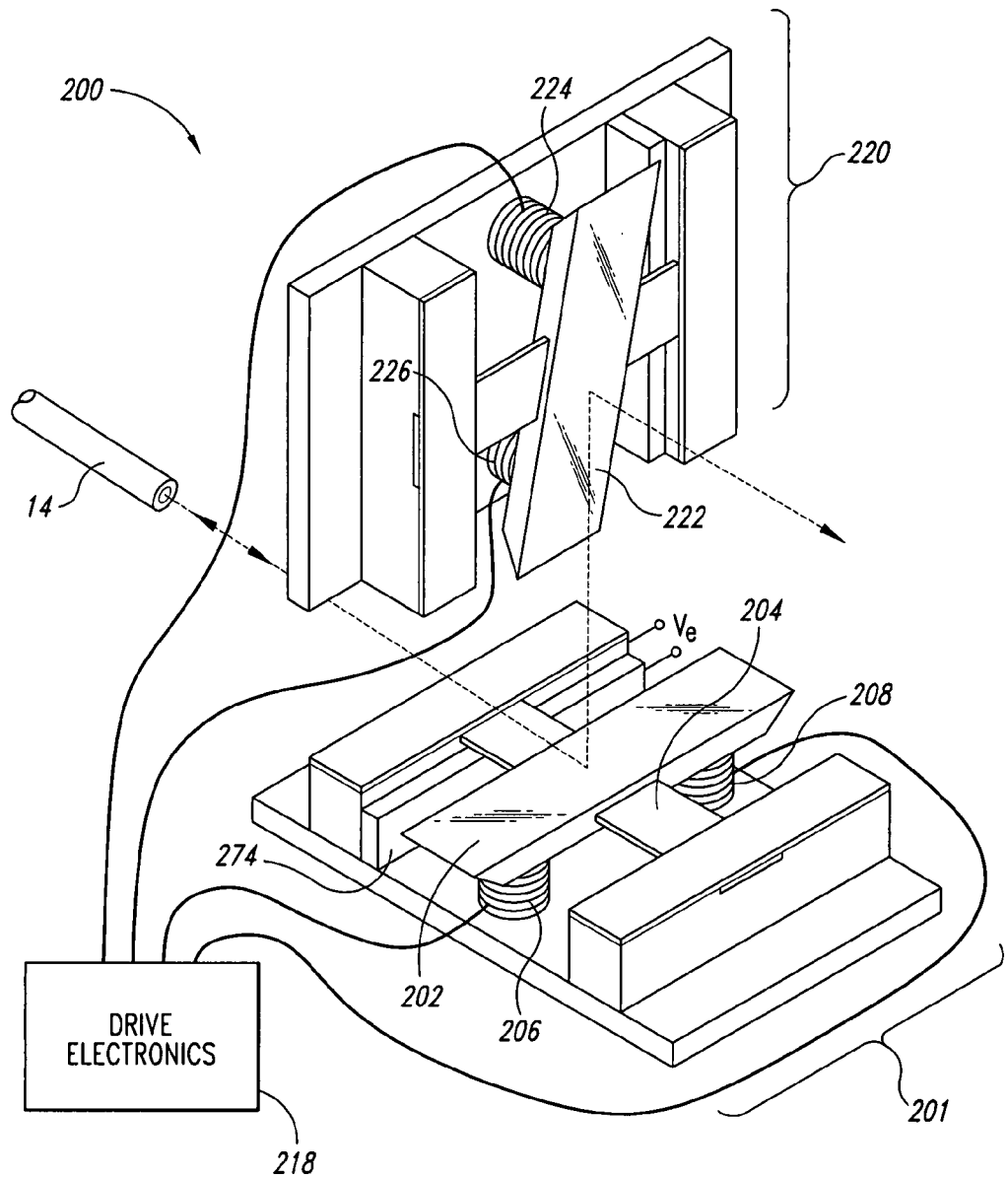
FIG. 10 is a diagrammatic representation of a scanning assembly in the scanning display of FIG. 5.

FIG. 10 shows one embodiment of a mechanically resonant scanner 200 suitable for use in some applications of the scanners 10, 12. The resonant scanner 200 includes as the principal horizontal scanning element, a horizontal scanner 201 that includes a moving mirror 202 mounted to a spring plate 204. The dimensions of the mirror 202 and spring plate 204 and the material properties of the spring plate 204 are selected so that the mirror 202 and spring plate 204 have a natural oscillatory frequency on the order of 10-100 kHz. A ferromagnetic material mounted with the mirror 202 is driven by a pair of electromagnetic coils 206, 208 to provide motive force to mirror 202, thereby initiating and sustaining oscillation. Drive electronics 218 provide electrical signal to activate the coils 206, 208.

Vertical scanning is provided by a vertical scanner 220 structured very similarly to the horizontal scanner 201. Like the horizontal scanner 201, the vertical scanner 220 includes a mirror 222 driven by a pair of coils 224, 226 in response to electrical signals from the drive electronics 218. However, because the rate of oscillation is much lower for vertical scanning, the vertical scanner is typically not resonant at high frequencies. The mirror 222 receives light from the horizontal scanner 200 and produces vertical deflection at about 30-100 Hz. Advantageously, the lower frequency allows the mirror 222 to be significantly larger than the mirror 202, thereby reducing constraints on the positioning of the vertical scanner 220.

An example of one such resonant scanner suitable for use in the device 60 is found in U.S. Pat. No. 5,557,444 of Melville, et. al. entitled MINIATURE OPTICAL SCANNER FOR A TWO-AXIS SCANNING SYSTEM which is incorporated herein by reference. One skilled in the art will recognize that other types of vertical scanners, such as acousto-optically driven scanners or commercially available magnetically driven scanners may also be within the scope of the invention.

For output scanning, the fiber 14 outputs light obtained by scanning the input scene. At the same time, the drive electronics 218 activate the coils 206, 208, 224, 226 to oscillate the mirrors 202, 222. The light strikes the oscillating horizontal mirror 202, and is deflected horizontally by an angle corresponding to the instantaneous angle of the mirror 202. The deflected light then strikes the vertical mirror 222 and is deflected at a vertical angle corresponding to the instantaneous angle of the vertical mirror 222. The scanning of the horizontal and vertical mirrors 202, 222 is synchronized with the horizontal and vertical scans of corresponding mirrors in the input scanner so that at each position of the mirrors, the output light comes from the corresponding position in the input scene. The scanner therefore "draws" the virtual image using the same light received from the input scene. As noted above, in some applications it may be desirable to phase shift the output mirrors 202, 222 to compensate for delays through the fiber 14. The output light may be scanned directly upon the user's retina in some applications to produce a perceived image. Displays employing scanned beams imaged upon a retina and mechanical resonant scanning are described in greater detail in U.S. Pat. No. 5,467,104, of Furness III, et. al. entitled VIRTUAL RETINAL DISPLAY, which is also incorporated herein by reference.

In certain applications, environmental factors may shift the natural resonant scanning of one of the scanners 10, 12. For example, where the environment of FIG. 4 is a high temperature environment, material properties in the scanner 10 may vary, thereby causing variations in the scanning frequency.

Still referring to FIG. 4, to ensure that the scanners 10, 12 remain substantially synchronized, the resonant frequencies of the scanners 10, 12 are tunable. The frequency of the input scanner 10 is allowed to vary in response to environmental factors. A detector 270 coupled to the input scanner 10 provides an output signal indicating the frequency of oscillation of the input scanner 10. The detector 270 is an optical fiber 271 aligned to an edge of the scanning range of the scanner 10, so that during each scan of the scanner 10, the fiber 14 receives a brief pulse of light. The optical fiber 271 transmits the light to the scanner 12 where a photodiode 272 converts the pulse of light to an electrical pulse. A second detector 276 in the scanner 12 provides a second set of pulses indicating the scanning frequency of the scanner 12. The pulses from the detectors 270, 276 are input to a comparing circuit 278 that outputs an error signal Ve having a voltage level corresponding to the error between the frequencies. Alternatively, it may be desirable in some applications to determine the synchronization information directly from the transmitted light. For example, a small light source or reflector can be positioned at the edge of the field of view of the input scanner 10 to provide a light pulse at the edge of each scan. Alternatively, signal-processing techniques can produce the synchronization signal directly from the light received by the scanner.

Returning to FIG. 6, the error signal drives a piezoelectric transducer 274 (visible in FIG. 10) in the scanner 12 that applies a force to the spring plate 204 (FIG. 10) in response. The applied force places stress in the spring plate 204 thereby shifting the spring constant. The adjusted spring constant shifts the resonant frequency of the scanner 12 to minimize the error signal and thus the error. The input scanner 10 thus acts as a master and the output scanner 12 acts as a slave. Although the frequency adjustment is described herein as being controlled by mechanical pressure on the spring plate, a variety of other approaches to frequency control may be within the scope of the invention. For example, the error signal Ve can drive a thermoelectric temperature controller to control the resonant frequency of output scanner 12. Alternatively, the Q of the slave scanner 12 can be damped so that the scanner 12 will scan adequately at frequencies varying slightly from the resonant frequency.

Although the detectors 270, 276 are described herein as being fully optical, one skilled in the art will recognize that several other types of detectors may be used. For example, where all-optical communication between the scene and the scanner 12 is not desired, the detectors may be photoelectric devices such as photodiodes. In such a configuration, electrical conductors would couple electrical signals from the photodiodes to the comparing circuit 278. Alternatively, the detectors 270, 276 may be electrical structures, such as piezoelectric detectors. In another alternative, where the scanners 10, 12 are MEMs devices, the detectors may be piezoresistive.

Also, although piezoelectric transducers control the scanning frequency in the embodiment of FIG. 4, other methods for controlling the scanning frequency may be within the scope of the invention. For example, the scanning frequency of the output scanner 12 may be controlled by adjusting the temperature of the output scanner 12 with a thermoelectric controller. Similarly, electronic servomechanisms can adjust the position of or stress on various components of the scanner 10, 12 to vary the frequency. For example, an Acme gear driven by servomechanism can convert rotational force from the servomechanism to longitudinal force on the spring plate 204.

Alternately, the scanners 10, 12 may be realized with acousto-optic scanners in some applications. One skilled in the art will recognize that such scanners 10, 12 can be synchronized by synchronizing the electrical signals used to drive the modulators. In such applications, an amplitude control loop will adjust the drive signal to compensate for changes in the deflection angle-versus-voltage that are caused by Q variations.

Figure 11A:
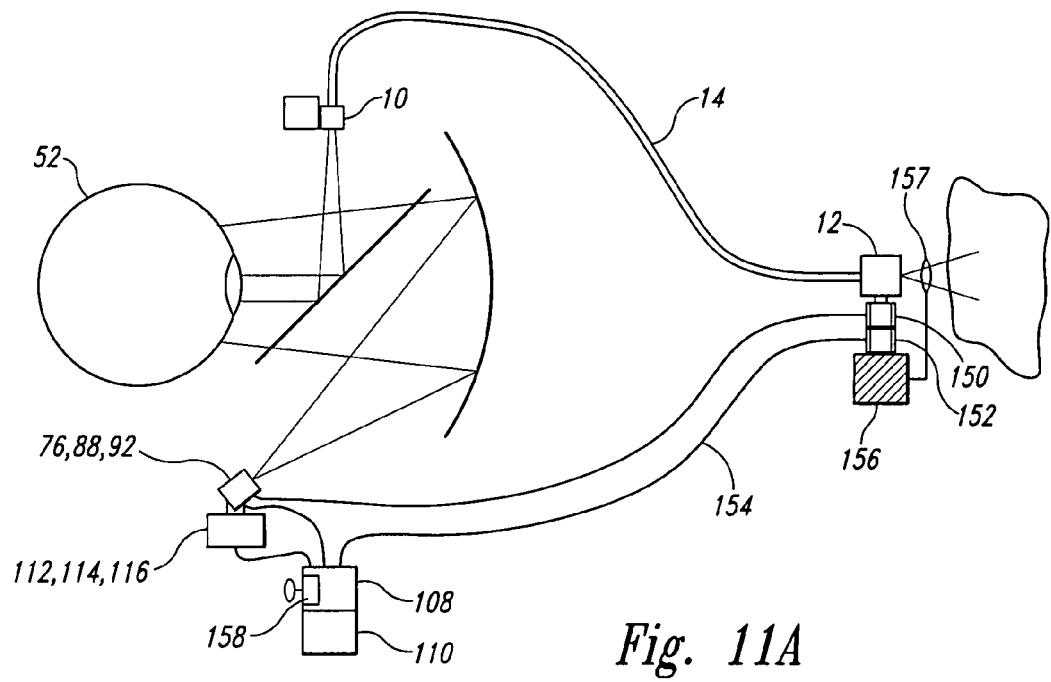
FIG. 11A is a diagrammatic representation of a dual-ended imager where the output scanner includes an eye tracker coupled to positioners in the input scanner.
Figure 11B:
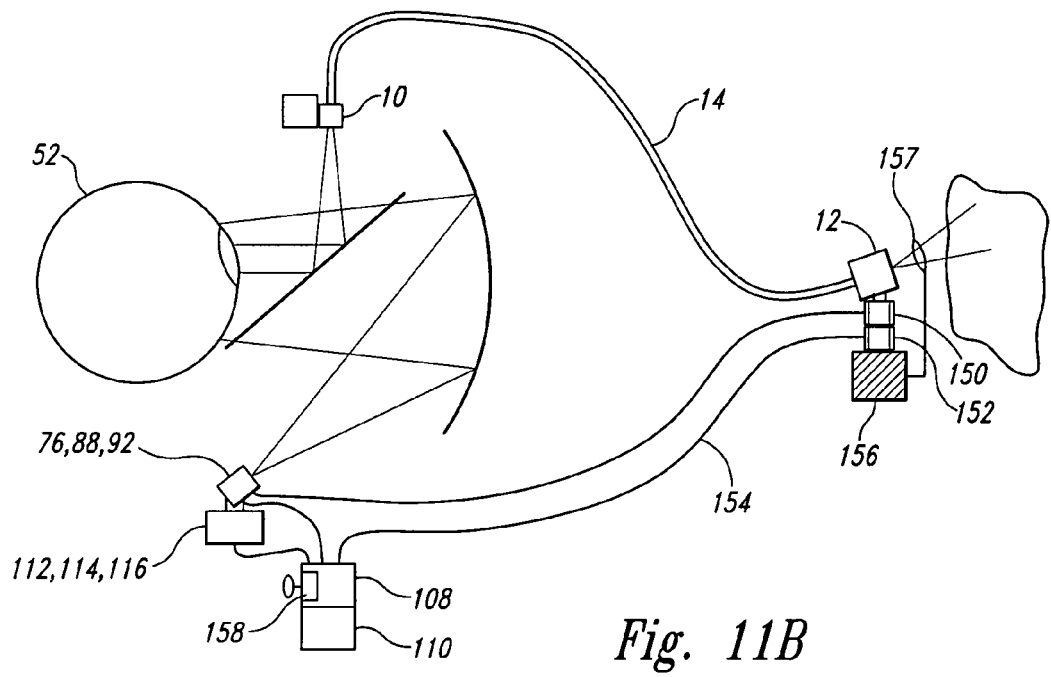
FIG. 11B is a diagrammatic representation of the dual-ended imager of FIG. 11A showing realignment of the input scanner in response to detected movement of the viewer's eye

As shown in FIGS. 11A and 11B, control electronics 108 can use the eye position information from the detector 88 to control the remote scanner 12. In this embodiment, the control electronics 108 activates positioners 150, 152 coupled in the scanner 12 in addition to the positioners 118, 120, 122 in the scanner 10. As the user's eye 52 moves (FIG. 11B), the control electronics 108 determines the angle at which the user is attempting to look. The control electronics 108 retrieves additional positioning information from a memory 110 and activates the positioners 150, 152 accordingly, through an electrical cable 154. Such information need not be transmitted electrically. For example, this information can be transmitted along the transmission fiber using wavelength division multiplexing or similar techniques for transmitting a plurality of signals along a common transmission path. In response, the positioners 150, 152 reposition and reorient the scanner 10 to change its effective field of view. Thus, as the user attempts to look left, right, up or down, the input scanner field of view can shift in response. At the same time, the output scanner 12 can track the viewer's eye position to help insure the viewer's cornea receives the scanned light.

In addition to following the viewer's field of view, the input scanner 10 also includes a z-axis positioner 156 that allows the user to effectively "focus" the input scanner 10. The user controls the z-axis positioner 156 by manually adjusting an electronic driver 158 that provides an input signal to the z-axis positioner 156. In response, the z-axis positioner 156 shifts the position of a low power lens 157 to establish the distance from which the scanner 12 optimally receives light reflected from the scene. One skilled in the art will recognize that, although the lens 157 and positioner 156 are represented diagrammatically for clarity of presentation, a variety of z-axis variability structures can be used. For example, variable lenses, such as those found in auto focus cameras can provide effective shifts along the z-axis.

Figure 12:
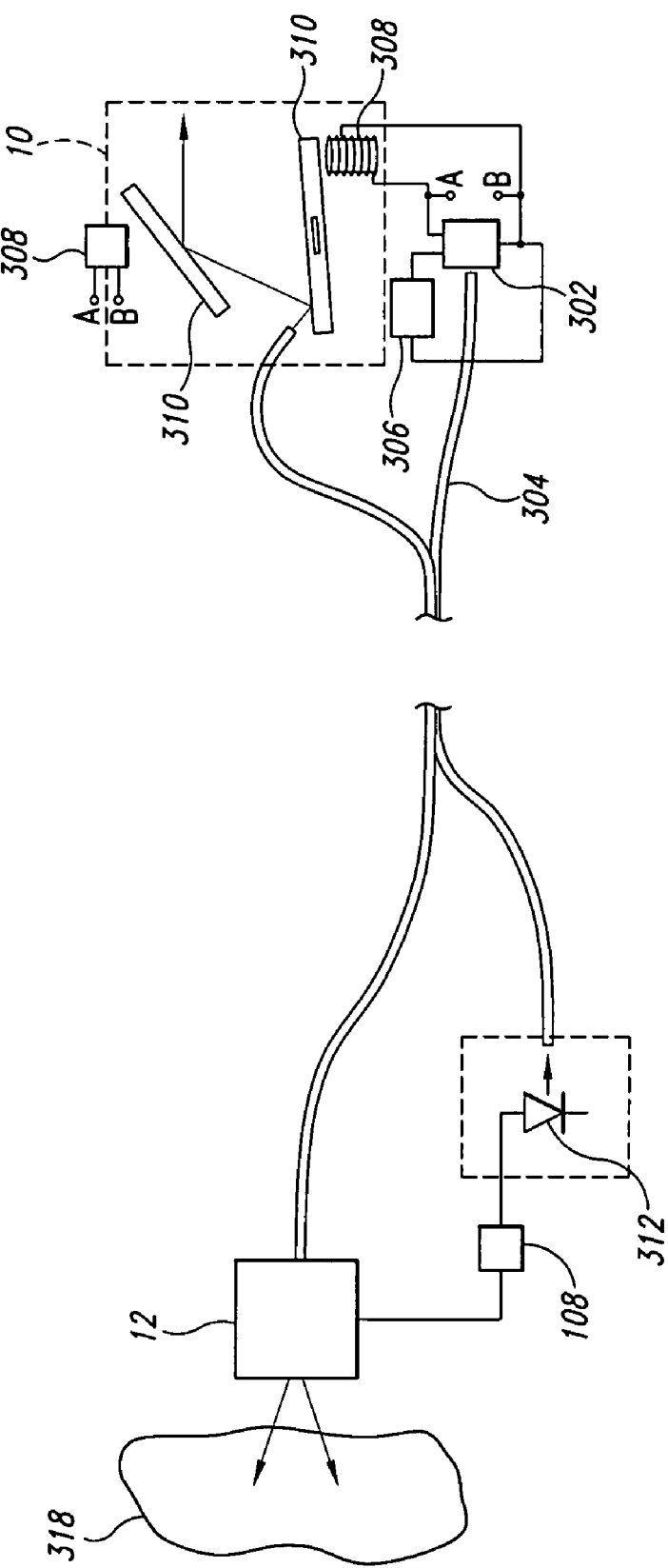
FIG. 12 is a diagrammatic representation of the dual-ended imager adapted for driving a scanner with an optical signal.

FIG. 12 shows another alternative embodiment where input signals for driving the input scanner 10 are optical, thereby eliminating the transmission of electrical driving signals to the scanner 10. In this embodiment, the scanner 10 is a magnetically driven mechanical resonant scanner that has an optoelectric device 302, such as a photodiode or phototransistor, that receives control signals from a secondary fiber 304. The optoelectric device 302 draws power from a battery 306 in response to optical signals from the secondary fiber 304 and drives a coil 308 to propel mirrors 310. The mirrors 310 scan light from the fiber 14 to scan an image as described above with reference to FIG. 4. Although the exemplary embodiment of FIG. 12 includes magnetic coils to drive the mirrors 310, other driving approaches, such as electrostatic (i.e., capacitive) or piezoelectric drivers, may be appropriate depending upon the particular application.

The optical signals for activating the optoelectric device 302 are provided by an infrared laser diode 312 driven by the control electronics 108 in response to the sensed scanning position of the output scanner 12. To synchronize the scanners 10, 12, the input scanner can be made with a relatively low Q or the master-slave approach described with reference to FIG. 10 can be applied.

As is also visible in FIG. 12, the output scanner 12 need not be a scanned retinal display. Instead, where sufficient light is available, the scanner 12 can scan light onto a screen or other target to produce a visible projected image 318.

Figure 13:
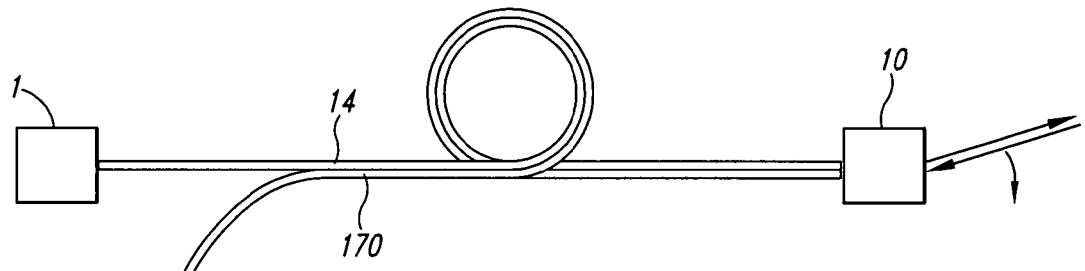
FIG. 13 is a diagrammatic representation of a dual-ended imager including separate fibers for illuminating a scene and transmitting light from the scene to a distal end.
Figure 14:
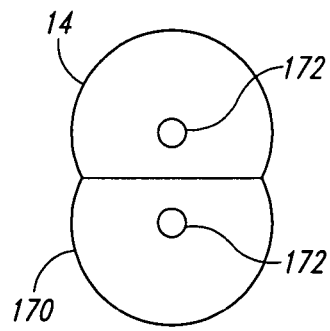
FIG. 14 is a cross-sectional view of the fibers of FIG. 13 showing D-shaped fibers.

FIG. 13 shows another embodiment of an imaging apparatus in which separate fibers are used for illuminating and imaging. In this embodiment, an illuminating fiber 170 extends from the light emitter 16 to the scanner 10. The illuminating fiber is etched to reduce its diameter and the transmission fiber 14 and illuminating fiber 170 are D-shaped, as shown in FIG. 14. The D-shapes and reduced diameters allow the fiber cores 172 to be positioned very close to each other. As a consequence, the light emitted by the illuminating fiber is substantially aligned with the field sensitivity of the transmission fiber 14. Thus, when light from the illuminating fiber 170 is reflected from the scene, a portion of the reflected light couples into the transmission fiber 14.

Figure 15:
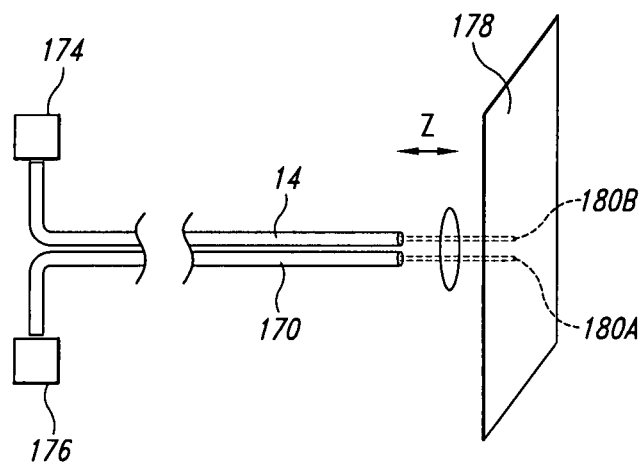
FIG. 15 is a diagrammatic representation of alignment of fibers during fabrication by aligning images on a screen.

During fabrication, alignment is aided by using overlapped images, as shown in FIG. 15. Each of the fibers 14, 170 receives input light from a respective source 174, 176 and both fibers 14, 170 output light onto a screen 178. In response, each fiber 14, 170 outputs light that is imaged onto a to form respective images 180A-B. The fibers 14, 170 are then adjusted until the images 180A-B overlap. Then, an optically cured epoxy is activated to fix the relative positions of the fibers 14, 170. Additionally or alternatively, other lenses, prisms, beam splitters or other optical elements can be used to properly align the optical paths defined by the fibers 14, 170.

As will now be explained with reference to FIG. 16, the imager 8 can easily provide apparent magnification of a scanned object 240. As can be seen by comparing the angular range of the input scanner 10 to that of the output scanner 12, the output scanner 12 has a larger angular swing than the input scanner 10. However, the scanners 10, 12 are synchronized so that each sweeps through its respective field of view in the same amount of time. Thus, the output scanner 12 sweeps at a larger angular rate than the input scanner 10. Consequently, the output scanner 12 outputs light from the scanned object 240 over the same amount of time, but over a larger angle than the input scanner 10. The viewer perceives a larger angular swing as a larger field of view and a reproduced object 240A appears enlarged to the viewer. Thus, with no data manipulation, the output image is an enlarged image of the input image, i.e., the image is effectively magnified. One skilled in the art will recognize that magnification can also be obtained by placing the input scanner close to the scanned object and adjusting coupling to the fiber with fiber coupling lens for sharp focus.

By varying the field of view of either the input or output scanner 10, 12, the imager 8 can vary its effective magnification. For example, increasing the amplitude of the driving signal to the output scanner 12 increases the angular swing of the output scanner 12, increasing the effective magnification. One skilled in the art will recognize a variety of approaches to increasing the drive signal amplitude either continuously, for a "zoom" effect, or incrementally.

Although the invention has been described herein by way of exemplary embodiments, variations in the structures and methods described herein may be made without departing from the spirit and scope of the invention. For example, the positioning of the various components may also be varied. Where imaging in a single direction is predominant, the optics of each of the scanners 10, 12 may differ. For example, the first scanner 10 may have a focal length selected for viewing as the input element of a microscope or a camera and the second scanner 12 may have a focal length selected for displaying an image to a viewer.

Also, although the system described herein has been describes as including one input scanner and one output scanner, a plurality of input or output scanners may be used. For example, light from the transmission fiber 14 can be split among a plurality of output scanners to provide an imaging system with a plurality of outputs. Such a system could allow a user to view the scene while a film or electronic detector records the viewed scene. Moreover, the light form the transmission fiber 14 can be directed to a photodetector, such as a photodiode, or may be scanned onto a two dimensional detector, such as a commercially available CCD. The photodetector produces an electrical signal indicative of the light form the transmission fiber that can be processed according to known techniques to drive an electronically driven display or to identify information about the remote environment. For example, if the remote environment includes one or two-dimensional symbols, such as barcodes or similar symbologies, the electrical signal can be decoded to identify information represented by the symbols.

Further, although the exemplary embodiment of the scanner described herein is a magnetically driven resonant scanner, other types of scanners may also be used. For example, a microelectomechanical (MEMs) scanner may be used in some applications. Examples of MEMs scanners are described in U.S. Pat. No. 5,629,790 entitled MICROMACHINED TORSIONAL SCANNER to Neukermans, et. al., U.S. Pat. No. 5,648,618 entitled MICROMACHINED HINGE HAVING AN INTEGRAL TORSIONAL SENSOR to Neukermans, et. al., and in U.S. Pat. No. 5,673,139 entitled MICROELECTROMECHANICAL TELEVISION SCANNING DEVICE AND METHOD FOR MAKING THE SAME to Johnson, each of which is incorporated herein by reference.

Additionally, although the light described herein is generally visible light, non-visible radiation may be used in some applications. For example, where the remote viewer is used to view body tissue, an ultraviolet or infrared wavelength may be desirable. In such applications, the user can view the image at the output scanner using a wavelength converter, such as an infrared viewer. Alternatively, the user can direct the light from the output scanner onto a screen containing a wavelength converting phosphor. The phosphor absorbs the non-visible radiation and, in response emits visible light for viewing.

Also, in some high ambient light applications or in applications where a photographic film or sensitive electronic detector detect the light from the output scanner 12, it may be desirable to eliminate the emitters 16, 18. In such an embodiment, the scanners 10, 12 can monitor visible light originating from their respective environments. In addition, the components and configurations described herein can be combined in a variety of ways and remain within the scope of the invention. For example, the structure for viewing a remote location using projection of an image, as described with reference to FIG. 2A can be combined with the structure of FIGS. 11A-B. Such a combination allows a user to view a remote environment with light scanned onto the user's retina. With appropriate beam splitting and filtering the combination allows bi-directional communication between two locations. Such a structure could be particularly useful if combined with audio for closed loop video telephony. Accordingly, the invention is not limited except as by the appended claims.

What is claimed is:
1. An image capture apparatus comprising:
  a light emitter operable to emit light;
  a beam scanner aligned to receive the emitted light and operable to scan the received light in a two-dimensional pattern;

imaging optics aligned to receive the scanned two-dimensional pattern and image the two dimensional scanned pattern onto an object, and further configured to collect light scattered from the object;

a detector configured to receive scattered light from the imaging optics;

an electronic controller coupled to the detector and operable to receive an electrical signal from the detector corresponding to the received scattered light; and an actuator coupled to the electronic controller operable to modify the relative alignment between the beam scanner and the imaging optics to change an imaged location on the object.

2. The image capture apparatus of claim 1 further comprising:

an optical fiber having a first end configured to receive the emitted light and second end, the optical fiber being configured to transmit the received light from the first end to the second end; and wherein the beam scanner is aligned to receive the emitted light from the second end of the optical fiber.

3. The image capture apparatus of claim 1 wherein the light emitter and the detector are mounted on a common substrate.

4. The image capture apparatus of claim 1 wherein the actuator is operable to vary an angle between the beam scanner and the imaging optics.

5. The image capture apparatus of claim 1 wherein the actuator is operable to steer the scanned beam.

6. The image capture apparatus of claim 1 wherein the controller is operable to automatically control the actuator responsive to a change between relative positions of the imaging optics and the object.

7. The image capture apparatus of claim 1 wherein the actuator is operable to modify the alignment of the beam scanner in three axes.

8. The image capture apparatus of claim 1 wherein the actuator comprises a piezoelectric positioner.

9. The image capture apparatus of claim 1 wherein the actuator comprises a shape memory alloy-based positioner.

10. The image capture apparatus of claim 1 wherein the beam scanner comprises a mechanically resonant scanner.

11. The image capture apparatus of claim 1 wherein the beam scanner comprises a MEMs scanner.

12. The image capture apparatus of claim 1 wherein the object includes a portion of a human body.

13. A system for scanning a field of view comprising:

a light source operable to emit light;

an optical fiber having a first end aligned to receive emitted light from the light source and a second end;

a MEMs scanner aligned to receive the light from the second end of the optical fiber and operable to scan the light through a partially-reflective imaging optic in a pattern having a field of view; and a photo-detector aligned to receive light scattered from the field of view.

14. The system for scanning a field of view of claim 13 wherein the photo-detector is positioned to receive light scattered from the field of view through the partially-reflective imaging optic.

15. The system for scanning a field of view of claim 13 further comprising:

a second optical fiber aligned to receive light scattered from the field of view;

and wherein the photo-detector is aligned to receive light scattered from the field of view through the second optical fiber.

\* \* \* \* \*